No. 822,675. PATENTED JUNE 5, 1906.
F. LILIGER.
HOOK LOCK.
APPLICATION FILED JULY 13, 1905.
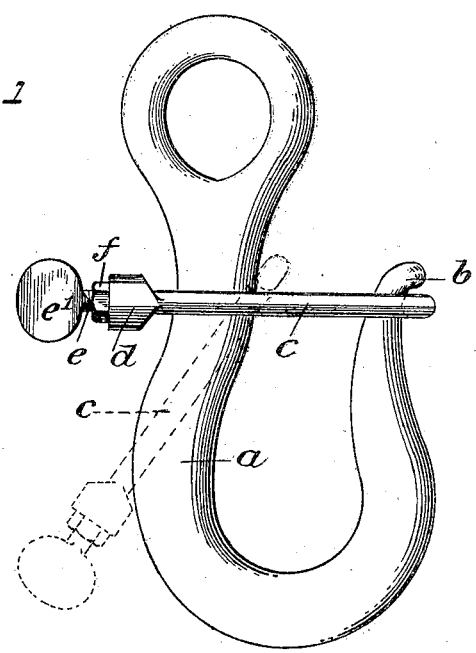
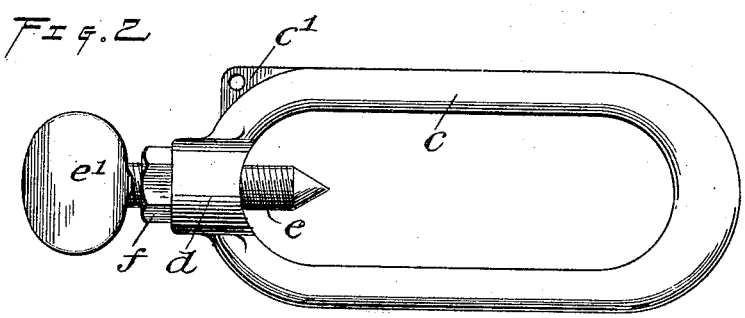
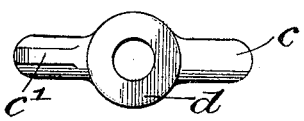
WITNESSES:
John J. Keith
Isaac B. Owens.
INVENTOR
Frank Liliger
BY
ATTORNEYS

UNITED STATES PATENT OFFICE.

FRANK LILIGER, OF ST. JOSEPH, MISSOURI.

HOOK-LOCK.

No. 822,675.

Specification of Letters Patent.

Patented June 5, 1906.

Application filed July 13, 1905. Serial No. 269,499.

*To all whom it may concern:*

Be it known that I, FRANK LILIGER, a citizen of the United States, and a resident of St. Joseph, in the county of Buchanan and State of Missouri, have invented a new and Improved Hook-Lock, of which the following is a full, clear, and exact description.

The invention relates to a device intended for locking or closing hooks, so that an article engaged therewith cannot be accidentally disengaged.

The invention is particularly intended for use in connection with tackle-hooks, although it may be employed for other purposes, as will be apparent hereinafter.

The invention resides in certain peculiar features of construction and arrangement of parts, which will be hereinafter fully described, and pointed out in the claims.

Reference is to be had to the accompanying drawings, which illustrate as an example the preferred embodiment of my invention, in which drawings, Figure 1 is a side view of the hook having the lock in active position and showing by broken lines the lock in inactive position. Fig. 2 is a plan view of the lock, and Fig. 3 is an end view of the same.

*a* indicates the hook, the bill *b* of which has an outward turn, as is usual. The lock consists of an oblong link *c*, which is arranged to inclose the bill and shank of the hook, as shown in the drawings, and which is provided at one end with a nut *d*, in which a screw *e* operates. This screw has a conical end enabling it firmly to impinge against the shank of the hook, and the outer end of the screw has a thumb-piece *e'* to facilitate the operation of the screw. *f* indicates the lock-nut for holding the screw in the desired position. At one end the link *c* is provided with a perforate lug *c'*, which is adapted to permit the connection of a whip or lanyard with the lock, so as to prevent loss thereof.

In using the device when it is desired to lock the hook the link *c* should be moved up and the screw *e* operated to force it into engagement with the shank of the hook. This securely holds the link in place and makes it impossible for a ring or other part engaged with the hook to jump out of the same. To open the hook, it is only necessary to release the screw *e*, whereupon the link may be allowed to fall to or below the position shown by broken lines in Fig. 1, or it may be entirely disengaged from the hook, in which latter case it is best to attach a lanyard to the lug *c'* and fasten the lanyard to a part of the tackle, thus preventing the loss of the link.

Having thus described the preferred form of my invention, what I claim as new, and desire to secure by Letters Patent, is—

1. A hook-lock comprising a link adapted to inclose the shank and bill of the hook, and a screw operating in a nut in one end of the link, said screw being adapted to engage the hook and bind the link firmly against the same.

2. A hook-lock comprising a link adapted to embrace the shank and bill of the hook, a nut integral with one end of the link, and a screw operating in the nut and adapted to engage the hook.

3. A hook-lock comprising a link adapted to inclose the shank and bill of the hook, and a screw operating in a nut in one end of the link, said screw being adapted to engage the hook and bind the link firmly against the same, said link having a perforate lug projecting therefrom and adapted to receive a lanyard.

4. A hook-lock comprising a link adapted to embrace the shank and bill of the hook, a nut integral with one end of the link, and a screw operating in the nut and adapted to engage the hook, said link having a perforate lug projecting therefrom and adapted to receive a lanyard.

5. A hook-lock comprising a link adapted to inclose the shank and bill of the hook, and a means adapted to act between the link and hook to bind the former against the latter.

In testimony whereof I have signed my name to this specification in the presence of two subscribing witnesses.

FRANK LILIGER.

Witnesses:
 CALVIN C. COLT,
 HARRY C. CARTER.